(No Model.)
H. JACOBY.
CHAIN PROTECTOR AND DUST GUARD FOR BICYCLES.
No. 577,581. Patented Feb. 23, 1897.
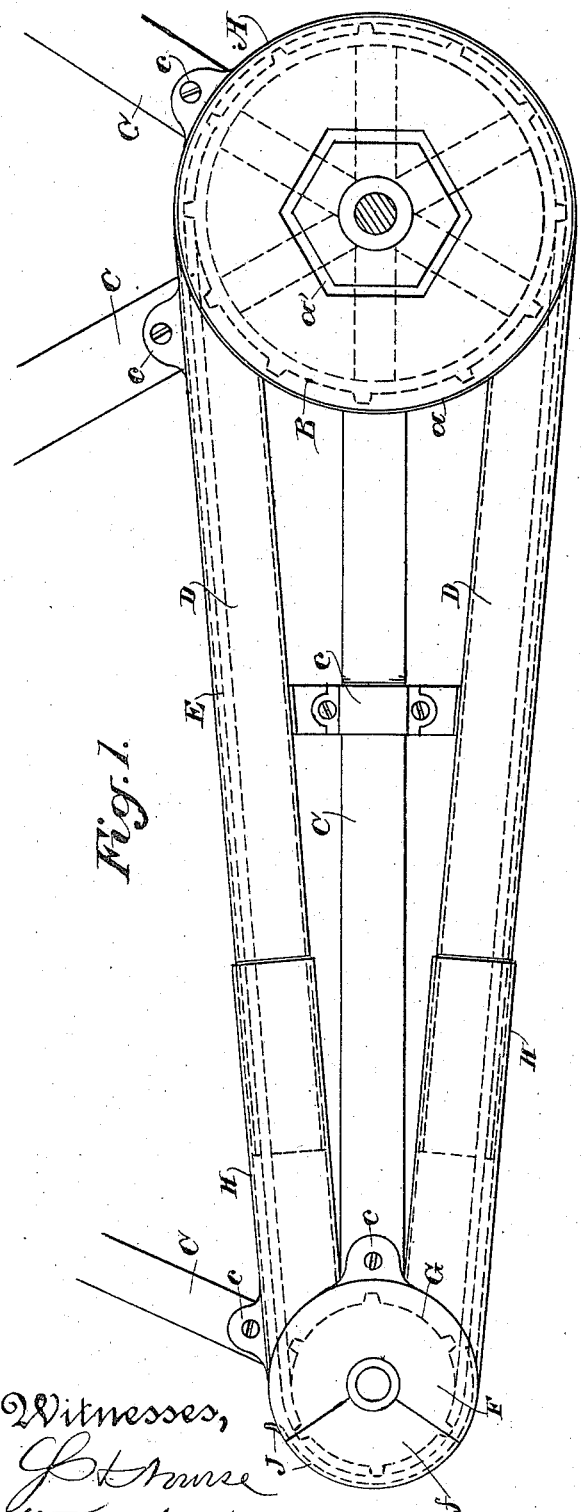
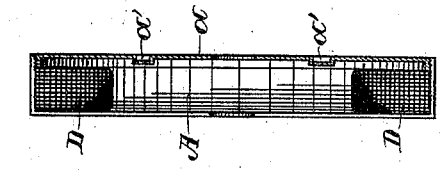
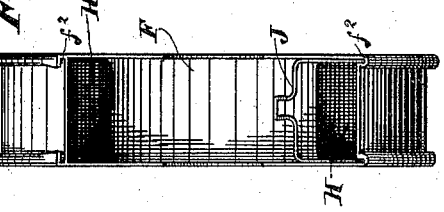
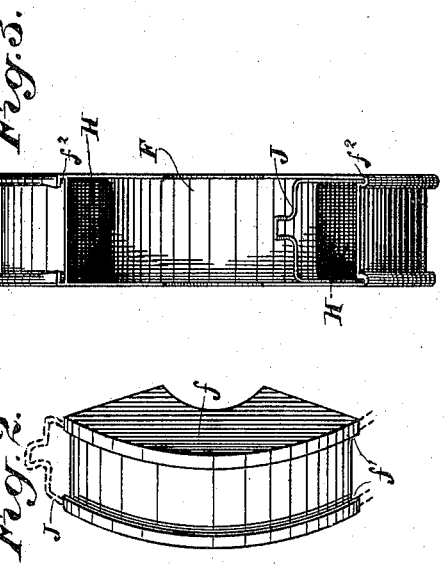
Witnesses,
Inventor,
Harry Jacoby

UNITED STATES PATENT OFFICE.

HARRY JACOBY, OF OROVILLE, CALIFORNIA.

CHAIN-PROTECTOR AND DUST-GUARD FOR BICYCLES.

SPECIFICATION forming part of Letters Patent No. 577,581, dated February 23, 1897.

Application filed May 11, 1896. Serial No. 591,165. (No model.)

*To all whom it may concern:*

Be it known that I, HARRY JACOBY, a citizen of the United States, residing at Oroville, county of Butte, State of California, have invented an Improvement in Chain-Protectors and Dust-Guards for Bicycles; and I hereby declare the following to be a full, clear, and exact description of the same.

My invention relates, broadly, to gear-covers, and especially to those covers designed as chain-protectors and dust-guards for bicycles and similarly-driven vehicles or velocipedes.

My invention consists in the novel construction and arrangement of the chain-protector and dust-guard which I shall hereinafter fully describe.

The object of my invention is to cover completely the sprocket wheels and chains of bicycles and other similarly-driven vehicles or velocipedes and protect the same from dust, dirt, and other substances which would cause wearing or interfere with their operation, at the same time acting as a guard to prevent the wearing-apparel of the rider from being caught in the gearing.

Referring to the accompanying drawings, Figure 1 is a side view of my protector and dust-guard. Fig. 2 is a perspective view of the removable section of the rear box or casing. Fig. 3 is a view of the remainder of the body of said box or casing. Fig. 4 is a diametrical section of the front casing or box.

A represents a box or casing which fits over and entirely incloses the larger sprocket-wheel B of a bicycle or other similarly-driven device, the frame of which, or such portion thereof as is necessary to illustrate my invention, is represented by C.

From the box or casing A extend rearwardly two hollow arms D, the open ends of which terminate at any point which may be desired in advance of the rear sprocket-wheel. These hollow arms communicate at their forward ends with the interior of the box or casing A, and the driving-chain E passes from the front sprocket-wheel through these arms.

F is a box or casing completely inclosing the rear sprocket-wheel G of the machine, and from this box or casing and communicating therewith extend forwardly two hollow arms H, which join and communicate with rear extremities of the hollow arms from the front box or casing. The joint is best effected by telescoping one set of arms with the other, whereby the device may be readily fitted and adjusted to various machines having different lengths of chains.

The chain passes to and from the rear sprocket through these hollow arms H, and by means of the two sets of hollow arms complete passages are formed for the chain, both folds of which are thereby fully inclosed and protected, and said chain, together with both sprockets, is protected in the boxes or casings. These parts are all held to the frame C by means of suitable ears and fastenings, as shown at c. Now in order to fit the boxes or casings to their places over the sprockets I make a portion of said boxes or casings removable, whereby they may be placed in position, and access may be had to their interior for the purpose of getting at the confined parts.

The front box or casing I have here shown as provided with a screw-threaded cover $a$, adapted to be screwed on and off by means of a suitable wrench entering sockets $a'$, formed in the face of the cover.

The rear box or casing I have shown as being formed with a removable section $f$ in the shape of a sector at the back portion of said box or casing, said sector being of a size sufficient, when removed, to permit the remainder of the box or casing to be fitted over the rear sprocket.

The removable sector-piece is locked in place by suitable means, here shown as consisting of a U-shaped wire slide J, the legs of which fit into grooves $f'$ on the exterior edges of the sector and pass into sockets $f^2$ in the main body of the box or casing.

The grooves $f'$ in the sector-piece are open on their inner sides in order to permit the head of the U-shaped slide to pass around over the sector and get beyond it, whereby the latter may be removed, and the sockets $f^2$ in the main body of the box or casing are complete or closed in, so that the wire slide is held in place and ready to be redrawn across the removable sector, and by overlapping its joints to be held in place.

Having thus described my invention, what I claim as new, and desire to secure by Letters Patent, is—

1. A chain-protector and dust-guard for gearing, comprising boxes or casings inclosing the terminal sprockets, one of said boxes having an open side, and a removable cover threaded into said open side and the other box having a removable sector-shaped piece and a U-shaped slide for locking it in place, said boxes also having hollow arms projecting toward each other, and communicating with the boxes, and with each other, whereby passages are formed for the chain.

2. In a chain-protector and dust-guard having boxes or casings inclosing the terminal sprockets and provided with hollow arms forming passages for the chain, a removable sector-shaped piece forming a part of one terminal box or casing, and having grooves open on their inner sides, and a U-shaped slide having legs adapted to fit the grooves of the sector-shaped piece and overlap the joints between this piece and the main part of the box, and lock said piece in place.

3. In a chain-protector and dust-guard for gearing, and in combination with the front box or casing having a removable cover by which access may be had to its interior, and backwardly-extending hollow arms for the chain, the rear box or casing, having a removable sector-shaped piece, with a sliding lock seated in peripheral grooves in said piece and in the body of the box or casing, and adapted to secure said piece and to free it, whereby it may be removed, said box or casing having forwardly-projecting hollow arms for the chain, joining and communicating with the hollow arms of the front box or casing.

Dated May 1, 1896.

HARRY JACOBY.

Witnesses:
A. F. JONES,
CHAS. L. BILLS.